United States Patent [19]
Garcia et al.

[11] Patent Number: 5,265,106
[45] Date of Patent: Nov. 23, 1993

[54] RAMAN LASER

[75] Inventors: Frédérique Garcia, Longjumeau; Daniel Vincent, Antony; Pierre Pinson, Vaugrigneuse; Jean-Michel Chiquier, les Ulis, all of France

[73] Assignee: Compagnie Industrielle des Lasers Cilas, Marcoussis, France

[21] Appl. No.: 896,592

[22] Filed: Jun. 10, 1992

[30] Foreign Application Priority Data

Jun. 10, 1991 [FR] France .................. 91 07023

[51] Int. Cl.⁵ .................................................. H01S 3/30
[52] U.S. Cl. .................................................. 372/3; 359/327
[58] Field of Search .............................. 372/3; 359/327

[56] References Cited

U.S. PATENT DOCUMENTS

| | | | |
|---|---|---|---|
| 4,144,464 | 3/1979 | Loree et al. | 359/327 |
| 4,570,081 | 2/1986 | Baldwin | 372/3 |
| 4,821,272 | 4/1989 | Bruesselbach et al. | 372/3 |
| 5,058,117 | 10/1991 | Soshan et al. | 372/3 |
| 5,090,016 | 2/1992 | Dewhirst et al. | 359/327 |

Primary Examiner—Léon Scott, Jr.
Attorney, Agent, or Firm—Fisher, Christen & Sabol

[57] ABSTRACT

According to the invention, the Brillouin-effect radiation created in the Raman cavity (14) is returned into the pumping laser (1) to increase the Raman output power.

12 Claims, 2 Drawing Sheets

RAMAN LASER

The present invention relates to a laser providing a radiation obtained by stimulation of a medium producing a Raman effect.

As is known, a Raman-effect laser is formed of a pumping laser, emitting a radiation at a first optical frequency, which is employed to excite a medium producing, by Raman effect, a second radiation at a second frequency, having a value different from that of the first.

The pumping laser is usually formed of a first resonant cavity containing an amplifying optical medium, and bounded on one side by a first totally reflecting mirror, while a part of the radiation may escape from the other side through a second, partially transparent mirror. The degree of reflection of this second mirror determines the amplification coefficient of this first resonant cavity. An optical Q-switch is situated on the optical path between the two mirrors, and is employed to retard the Q-switching of the pumping laser until the instant when the laser-effect medium has received a sufficient quantity of energy; this thus permits a Q-switching with a steeper front. This optical Q-switch may be a body, the transmission factor of which is electrically controlled, or indeed a saturable absorbing body, which becomes transparent when it has received a certain optical energy.

The Raman-effect medium is usually a pressurized gas, such as methane, contained in a cell bounded by two opposite windows. The first radiation is injected into said cell through one of the windows, in order to create there said second radiation by Raman effect. A converging optical system, situated between said pumping laser and said cell, is employed to focus this first radiation in such a manner as to increase the density thereof within a limited volume of said Raman-effect medium, and thus to improve the optical energy conversion yield.

The European Patent EP-A-0,063,205 describes such an assembly. However, this document indicates that, in addition to the radiation due to the Raman effect, a radiation due to the Brillouin effect is also produced, which represents a hazard for the optical components of the pumping laser and reduces the energy thereof. In order to eliminate this radiation due to the Brillouin effect, use is made of a polarized laser, followed by a polarizer and by a quarter-wave plate between the pumping laser and the cell containing the Raman-effect medium, in such a manner as to block the return of the radiation due to the Brillouin effect into the pumping laser.

Such an assembly imposes constraints, on the one hand on account of the need to select a polarized laser, and on the other hand on account of the need to set up a polarizer and a quarter-wave plate to eliminate the radiation emitted by Brillouin effect. Furthermore, such an assembly does not avoid the harmful effect of the radiation created by Brillouin effect on the conversion yield, in the Raman-effect medium, between the radiation emitted by the pumping laser and the Raman radiation which results therefrom, and thus on the optical power available at the exit, at the Raman frequency.

Likewise, the Patent US-A-4,821,272 also indicates that, in addition to the radiation due to the Raman effect, a radiation due to the Brillouin effect is also produced, which is in direct competition with the Raman effect, and reduces the conversion yield due to the Raman effect. In order to eliminate this radiation due to the Brillouin effect, a polarizer and a quarter-wave plate are inserted between the pumping laser and the cell containing the Raman-effect medium, in such a manner as to block the return of the radiation due to the Brillouin effect into said first resonant cavity of the pumping laser. This same document indicates another assembly, which is compact and perfectly aligned and which permits the limitation of the energy emitted by Brillouin effect; this avoids the need to set up a polarizer, but does not permit the full avoidance of the harmful influence due to the Brillouin effect.

This Brillouin effect imposes constraints of selection of components and of assembly, and reduces the conversion yield due to the Raman effect, and thus the power at the exit at the Raman frequency. Further, the principal object of the known devices is to eliminate as far as possible the radiation due to the Brillouin effect.

The present invention aims at avoiding these constraints, and furthermore permits an increased output power at the Raman frequency to be obtained.

To this end, according to the invention, a first embodiment of the Raman-effect laser, comprising:

a pumping laser formed of a first resonant cavity resonating along a first optical axis, said cavity being bounded respectively, on two opposite sides, by a first mirror and a second mirror, of optical axes aligned with said first optical axis, which are respectively totally reflecting and slightly reflecting at said first optical frequency, said first resonant cavity including an optical Q-switch, capable of retarding the resonance of said first resonant cavity, as well as an amplifying optical medium which may be excited by an excitation means, this first resonant cavity supplying, through said second mirror, a first optical radiation, at a first optical frequency;

a Raman-effect medium, contained in a cell, receiving said first radiation and supplying, in response, a second radiation by Raman effect, at a second optical frequency, as well as a third radiation, at a third optical frequency, which third radiation is obtained by Brillouin effect; and a second resonant cavity, containing said cell, and tuned to said second optical frequency, which is bounded, on one side, by a third mirror, of optical axis aligned with said second optical axis, which is totally transparent at said first optical frequency and totally reflecting at said second optical frequency, and bounded, on the opposite side, by a fourth mirror, of optical axis aligned with said second optical axis, which is totally transparent at said first optical frequency and partially reflecting at said second optical frequency, and including a telescope with a real focus, of optical axis aligned with said second optical axis, the focal point of which is situated in said Raman-effect medium, is noteworthy in that, at said third optical frequency, said second and third mirrors are transparent, thus permitting the deflection of said third radiation into said first resonant cavity, and said first mirror is reflecting.

Thus, in contrast to what is done in the prior art, the radiation created by Brillouin effect may return into the first resonant cavity of the pumping laser and provide it with a complementary excitation permitting it, in return, to supply a higher energy to the Raman-effect medium, and thus to have a higher output power of the Raman-effect laser. It will be noted that this radiation created by Brillouin effect is, in principle, retarded in relation to the first radiation which creates it, so that this Brillouin radiation does not need to be blocked by the optical Q-switch prior to the Q-switching of the pumping laser, and that, on the other hand, it has the effect of reinforcing the start of the pulse as soon as this optical Q-switch transmits a sufficient quantity of the first radiation; this is equivalent to accelerating the effect of the change of optical state of this optical Q-switch. Moreover, there is no longer any need to take measures of critical alignment of the optical elements, as indicated in the patent US-A-4,821,272, to minimize the radiation due to the Brillouin effect. Preferably, said second and third mirrors of said Raman-effect laser are attached.

The compactness of the Raman-effect laser is thus improved, and the distortions of transmission of the optical radiations and the transit time are reduced.

Said second and third mirrors of said Raman-effect laser may even be coincident.

As a result of this, the number of optical components is reduced, as are the corresponding distortions.

Moreover, in a second embodiment of the Raman-effect laser according to the invention and including:
- a pumping laser formed of a first resonant cavity resonating along a first optical axis, said cavity being bounded respectively, on two opposite sides, by a first mirror and a second mirror, of optical axes aligned with said first optical axis which are respectively totally reflecting and slightly reflecting at said first optical frequency, said first resonant cavity including an optical Q-switch, capable of retarding the resonance of said first resonant cavity, as well as an amplifying optical medium which can be excited by an excitation means, this first resonant cavity supplying, through said second mirror, a first optical radiation at a first optical frequency;
- a Raman-effect medium, contained in a cell, receiving said first radiation and supplying, in response, a second radiation by Raman effect, at a second optical frequency, as well as a third radiation, at a third optical frequency, obtained by Brillouin effect;
- a second resonant cavity, containing said cell, and tuned to said second optical frequency, which is bounded, on one side, by a third mirror of optical axis aligned with said second optical axis, which is totally transparent at said first optical frequency and partially reflecting at said second optical frequency, and bounded, on the opposite side, by a fourth mirror, of optical axis aligned with said second optical axis, which is totally transparent at said first optical frequency and totally reflecting at said second optical frequency, and including a telescope with a real focus, of optical axis aligned with said second optical axis, the focal point of which is situated in said Raman-effect medium; and
- an optical extractor element, situated on the optical path between said first resonant cavity and second cell, receiving said first radiation emanating from said first resonant cavity and transmitting it at least partially to said cell, it is provided that, at said third optical frequency, said second mirror and third mirrors are transparent, thus permitting the deflection of said third radiation into said first resonant cavity, while said first mirror is reflecting, and that said optical extractor element is, at said third optical frequency, capable of permitting the passage of said third radiation towards said first resonant cavity, and is capable of directing said second radiation in a direction other than that proceeding towards the first resonant cavity, thus permitting it to emerge from said Raman-effect laser. This second embodiment exhibits the same advantages as those indicated for the first embodiment, on account of the fact that the radiation created by Brillouin effect may return into the first resonant cavity of the pumping laser and may provide it with a complementary excitation permitting it, in return, to supply a higher energy to the Raman-effect medium, and thus to have a higher power at the exit of the Raman-effect laser.

According to a third embodiment, the Raman-effect laser according to the invention, including:
- a pumping laser formed of a first resonant cavity resonating along a first optical axis, said cavity being bounded respectively, on two opposite sides, by a first mirror and a second mirror, of optical axes aligned with said first optical axis, which are respectively totally reflecting and slightly reflecting at said first optical frequency, said first resonant cavity including an optical Q-switch, capable of retarding the resonance of said first resonant cavity, as well as an amplifying optical medium which can be excited by an excitation means, this first resonant cavity supplying, through said second mirror, a first optical radiation at a first optical frequency;
- a Raman-effect medium, contained in a cell, receiving said first radiation and supplying, in response, a second radiation by Raman effect, at a second optical frequency, as well as a third radiation, at a third optical frequency, obtained by Brillouin effect;
- a second resonant cavity, containing said cell, and tuned to said second optical frequency, which is bounded, on one side, by a third mirror, of optical axis aligned with said second optical axis, which is totally transparent at said first optical frequency and totally reflecting at said second optical frequency, and bounded, on the opposite side, by a fourth mirror, of optical axis aligned with said second optical axis, which is totally reflecting at said first optical frequency and partially reflecting at said second optical frequency, and including a telescope with a real focus, of optical axis aligned with said second optical axis, the focal point of which is situated in said Raman-effect medium;
- an optical polarizer, situated on the optical path between said second mirror and third mirror; and
- a quarter-wave plate, tuned to said first frequency, situated between said cell and said fourth mirror, is noteworthy in that, at said third optical frequency, said second mirror and third mirror and said polarizer are transparent, thus permitting the deflection of said third radiation into said first resonant cavity, while said first mirror is reflecting.

This third embodiment also exhibits the advantages of the first two embodiments, on account of the fact that the radiation created by Brillouin effect can return into the resonant cavity of the pumping laser and can provide it with a complementary excitation permitting it, in return, to supply a higher energy to the Raman-effect medium, and thus to have a higher power at the exit of the Raman-effect laser. In particular, that part of the first radiation which returns from the second resonant cavity cannot have the effect of disturbing the first resonant cavity. That part of the second radiation which is reflected by the third mirror and the fourth mirror also contributes to increasing the yield.

It should be noted that said Raman-effect laser according to one of the aforementioned embodiments may include a YAG:Nd laser performing the function of said pumping laser.

Moreover, said Raman-effect laser exhibits the advantage, in the case of all the embodiments indicated hereinabove, of being capable of including said optical Q-switch in the form of a saturable absorber.

As a result of this, the control structure of said laser is very simple. Furthermore, the energy created by Brillouin effect provides a supplementary excitation promoting the switching of said saturable absorber and the extraction of energy from the amplifying medium.

Furthermore, in the case of all the embodiments indicated hereinabove, the Raman-effect laser may include a deflector, situated on the optical path between said first resonant cavity and said cell, and capable of deflecting said first and third optical frequencies by one and the same angle.

The Raman-effect laser may thus be constructed in a compact form.

As regards the Raman-effect medium and the cell containing it, in the case of all the embodiments indicated hereinabove, said Raman-effect laser permits the utilization of a cell including an entrance window and an exit window transmitting said first, second and third frequencies, while said Raman medium is a gas.

As a result of this, it is possible to construct said Raman-effect laser by means of a cell of conventional design and of a customary gas, which are commercially available.

It should be noted, in the case of all the embodiments indicated hereinabove, that at least one window of said cell of said Raman-effect laser may be formed of a mirror.

This thus permits a reduction in the number of optical components and a reduction in the corresponding distortions.

In the case of all the embodiments indicated hereinabove, said Raman-effect laser also has the advantage of being able to include at least one focusing element and an adjacent mirror which are constructed in the form of a single optical element.

The number of optical components is thus reduced, and their distortion is reduced.

Moreover, in the case of all the embodiments indicated hereinabove, said Raman-effect laser may have at least one focusing element which has an identical focal length for the first and the second frequency.

The path of the radiations at the first and the second frequency is thus the same.

The figures of the accompanying drawing will provide a good understanding of how the invention may be performed. In these figures, identical references designate identical or similar elements.

Figure 1:
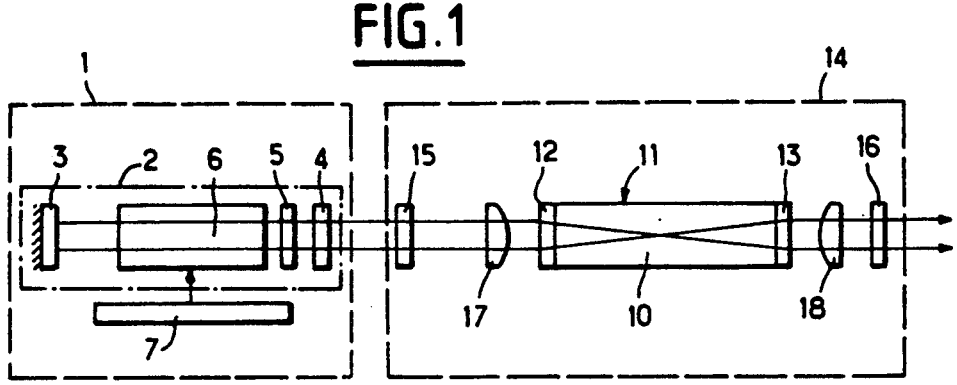
FIG. 1 illustrates a first embodiment of the Raman-effect laser according to the invention.

The Raman-effect laser, according to the present invention and shown in FIG. 1, is formed of a pumping laser 1, for example of the YAG:Nd type, formed of a first resonant cavity 2 having a first optical axis, which cavity is bounded, on one side, by a first mirror 3 and, on the opposite side, by a second mirror 4, both having an optical axis aligned with said first optical axis. This first resonant cavity 2 contains an optical Q-switch 5 placed between the first mirror 3 and the second mirror 4, and the function of which is to retard the start of the optical pulses created by an amplifying optical medium 6 situated in said first resonant cavity 2 of optical axis aligned with said first optical axis; said amplifying optical medium 6 is capable of being excited by an excitation means 7, such as a flash lamp. The optical Q-switch 5 produces a damping of the oscillation of said first resonant cavity 2, in such a manner as to avoid commencement of emission while the amplifying optical medium 6 has not yet fully absorbed the energy coming from the excitation means 7. This pumping laser 1 provides a first radiation, in the form of pulses, at a first frequency corresponding to a wavelength of 1.06 $\mu$m. Said first mirror 3 is totally reflecting at said first frequency, while said second mirror 4 exhibits a relatively small reflection coefficient at this first frequency, and thus transmits a large part of this first radiation to the exterior of said first resonant cavity 2.

A Raman-effect medium 10 formed, in this example, of pressurized methane, is able to receive said first radiation, and is capable of emitting in response, by Raman effect, a second radiation at a second frequency corresponding to a wavelength of 1.54 $\mu$m, as well as a third radiation, at a third frequency of value close to that of said first frequency, by Brillouin effect. This Raman-effect medium 10 is contained in a cell 11 bounded by a first and a second window, 12 and 13 respectively, which are situated in two opposite sides of this cell 11.

Said third and fourth mirrors have one and the same second optical axis, substantially perpendicular to the two windows 12 and 13, and this cell 11 receives, along said second optical axis, said first optical radiation through the first window 12. This cell 11 is placed in a second resonant cavity 14, of optical axis aligned with said second optical axis, resonating at said second frequency, and bounded, on one side, by a third mirror 15 which is totally transparent at said first and third frequencies, and totally reflecting at said second frequency, and bounded, on the opposite side, by a fourth mirror 16, which is transparent at said first frequency and partially reflecting at said second frequency. In this second resonant cavity 14 there is placed, respectively on either side of said Raman-effect medium 10, a first focusing element 17, such as a lens, and a second focusing element 18, such as a lens, causing convergence or collimation of this first radiation, entering or reflected respectively, in a volume of limited size of said Raman-effect medium 10.

The optical axes of said third mirror 15, fourth mirror 16, first focusing element 17 and second focusing element 18 are aligned with said second optical axis, and the first and second focusing elements, 17 and 18 respectively, are placed in such a manner that they cause the convergence to one and the same point, situated in said Raman medium 10, of any beam of rays parallel to said second optical axis and directed towards said Raman-effect medium 10. The second resonant cavity 14 thus includes an optical system forming a telescope, which system is formed of the first and second focusing elements 17 and 18, and causes convergence of the radiations reflected in this second resonant cavity 40 within a volume of very limited size of said Raman-effect medium 10.

The first mirror 3 is reflecting at said third frequency, while the second mirror 4 is at least partially transparent at said third frequency. This second mirror 4 may be a plane mirror; this facilitates the construction thereof.

Figure 2:
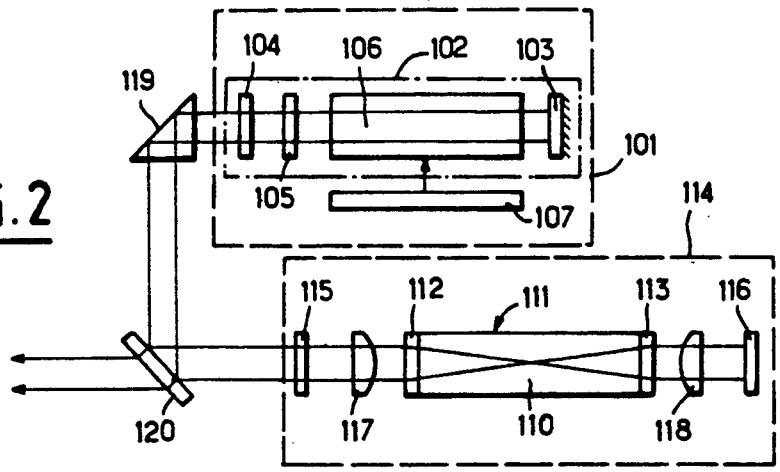
FIG. 2 shows a second embodiment of the Raman-effect laser according to the invention.

FIG. 2 shows a Raman-effect laser according to the invention, which includes the same elements as those shown in FIG. 1, with reflection properties which are modified with regard to certain mirrors, referenced by one and the same numeral of the same decade and unit as that of FIG. 1, preceded by the hundred digit 1. Only the function of the new elements, or that of the mirrors already described where this differs, is explained hereinbelow.

A pumping laser 101, corresponding to the pumping laser 1, includes elements referenced by the references 102 to 107 respectively, which are similar to the elements referenced by the references 2 to 7 and having the same functions. Likewise, a cell 111 includes or is associated with elements 112, 113, 110, 117 and 118 respectively, which are similar to the elements 12, 13, 10, 17 and 18, and having the same functions. On the other hand, said third and fourth mirrors 15 and 16 are respectively replaced by third mirror 115 and fourth mirror 116, having the same relative position, but with different reflection properties. Thus, the third mirror 115 is still totally transparent at the first optical frequency, but is partially reflecting at the second optical frequency, while the fourth mirror 116 is still transparent at the first optical frequency but is totally reflecting at the second optical frequency.

This assembly further includes a deflector 119 as well as a dichroic mirror 120 having a function of optical extractor element, which are situated between the second mirror 104 and the third mirror 115, the function of the deflector 119 being to change the direction of the optical beams entering or leaving said pumping laser 101, while the dichroic mirror 120 has one and the same effect and, furthermore, has said function of optical extractor element separating the optical beam reaching it into two beams of differing orientations, it thus being possible for the second optical frequency to emerge by passing through it.

Figure 3:
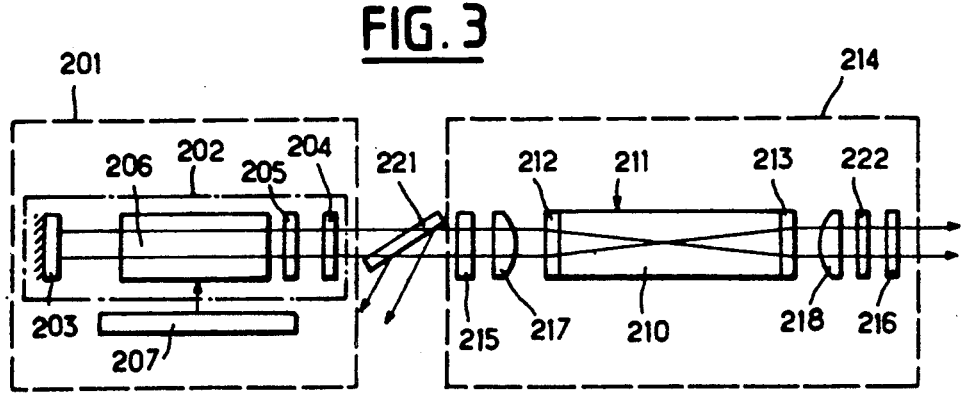
FIG. 3 represents a third embodiment of the Raman-effect laser according to the invention.

FIG. 3 shows a third embodiment of a Raman-effect laser according to the invention, which includes the same elements as those shown in FIG. 1, with reflection properties which are modified with regard to certain mirrors, referenced by one and the same decade digit and unit digit as that of FIG. 1, preceded by the hundred digit 2. Only the function of the elements which are new as compared with this FIG. 1, or that of the mirrors already described, where this differs, is explained hereinbelow.

A pumping laser 201, corresponding to the pumping laser 1, includes elements referenced by the references 202 to 207 respectively, which are similar to the elements referenced by the references 2 to 7 and having the same function, the radiation emanating from this pumping laser 201 being polarized by a means such as a polarizing plate, not shown. Likewise, a cell 211 includes or is associated with elements 212, 213, 210, 215, 217 and 218 respectively, which are similar to the elements 12, 13, 10, 15, 17 and 18, and having the same function. On the other hand, said fourth mirror 16 is replaced by a fourth mirror 216, having the same relative position, but with different reflection properties. Thus, the fourth mirror 216 is totally reflecting at the first optical frequency, while remaining partially reflecting at the second optical frequency.

Furthermore, a polarizer 221 is situated between said second mirror 204 and said third mirror 215, while a quarter-wave plate 222, tuned to said first frequency, is situated between the second focusing element 218 and said fourth mirror 216. Said polarizer 221 is oriented in such a manner that it transmits the polarized radiation emanating from said first resonant cavity 202.

The functioning of the assembly of FIG. 1 is the following. The excitation means 7 emits a light pulse which excites the amplifying optical medium 6. The latter, in response, tends to create a laser emission amplified by the first resonant cavity 2 by means of the first mirror 3 and second mirror 4. However, the reflection coefficient of the second mirror 4 being low, for example in the order of 20 to 30 percent, the amplification coefficient of this first resonant cavity 2 is relatively low and, furthermore, the optical Q-switch 5 further reduces this amplification. On account of this, the oscillation cannot be initiated. When the optical Q-switch 5 starts to become transparent, in consequence of an electrical command or, of course, in the case of a saturable absorber, the oscillation grows very slowly and the Q-switch transmits a significant part of the first radiation; the effect of this is to excite said Raman- 0 effect medium 10, which produces said third radiation by Brillouin effect. This third radiation is emitted in return towards said first resonant cavity 2 and may penetrate therein, on account of the transparency of the mirrors in its path. This third radiation has phase conjugation properties which maintain the coherence of the beam exciting the Raman-effect medium 10; the effect of this is to supply and to extract a complementary energy in said first resonant cavity 2, and this involves, in return, an enhanced excitation supplied to said Raman-effect medium 10 which then provides a second Raman radiation at 1.54 $\mu$m of power exceeding that which it would provide if said third radiation due to the Brillouin effect were blocked in return towards the pumping laser 1. The interaction length of said third radiation with said amplifying optical medium 6 is increased on account of the fact that said first mirror 3 is reflecting at said third frequency. Furthermore, the second resonant cavity 14, which includes said telescope 17 and 18, further amplifies the second radiation due to the Raman effect, on account of the multiple passage of reflected energy within the already excited volume of the Raman-effect medium 10. The optical elements which have been described are, preferably, placed in proximity to one another, in such a manner as to minimize the distortions and the transit times.

In the second assembly shown in FIG. 2, between the pumping laser 101 and the third mirror 115 there are placed the deflector 119 and the mirror 120. On account of this, the second optical axis, relative to the cell 111 including the Raman-effect medium 110, may be disaligned in relation to the first optical axis; this permits the provision of a more compact assembly. The first radiation, emanating from the pumping laser 101, is deflected by the deflector 119, and then by the mirror 120, is reflected thereat along the second optical axis, enters into the cell 111 and emerges therefrom again to pass then through the second focusing element 118 and the fourth mirror 116. The second radiation emitted by the Raman-effect medium 110 is reflected by this fourth mirror 116 and may partially pass through the third mirror 115 to reach the mirror 120, which it partially passes through to emerge from the assembly and thus to constitute the output of the Raman-effect laser. As previously, the Raman-effect medium 110 creates a third radiation, by the Brillouin effect, which is emitted in return towards said pumping laser 101, and which follows the inverse path of that followed by said first radiation; this involves the same result as initially explained.

The assembly shown in FIG. 3 has an operation which is fairly close to that shown in FIG. 1, except that the first pumping radiation, after having passed through the Raman-effect 210 and Brillouin-effect medium, is totally reflected by the fourth mirror 216 and again passes through this Raman-effect medium 210, being collimated thereat, in return, by the second focusing element 218, which focuses the radiation at the focal point of the first focusing element 217; this increases the energy received by the volume of reduced size of the Raman-effect medium 210 situated about said focal point and thus increases its emission by Raman effect. The polarizer 221, oriented in such a manner that it is traversed by the first polarized radiation emanating from the pumping laser 201, is employed to prevent a situation in which the first radiation reflected by the fourth mirror 216 has the effect of disturbing the first resonant cavity 202. To achieve this, the first radiation emitted by said first resonant cavity 202 reaches the fourth mirror 216 after passing through this polarizer 221, and then the quarter-wave plate 222, tuned to said first frequency, and which may be placed at any point of the path between the second window 213 and the fourth mirror 216. The outward and return pass through this quarter-wave plate 222 involves an angular rotation of 90 degrees, which prevents the transmission, by the polarizer 221, of the first radiation towards said first resonant cavity 202.

In all the figures, a representation has been given of optical elements having in general only a single function, in order to facilitate the statement thereof. However, a plurality of optical elements which are adjacent, that is to say not separated by another optical element, may be attached; this may facilitate the assembly thereof. Furthermore, some of these adjacent optical elements may be constructed in the form of a single optical element having the desired functions; this simplifies the assembly, improves its optical qualities and reduces the cost thereof. In particular, the first and second focusing elements 17 and 18 may be constructed in the form of a mirror having the desired reflectivity and transparency properties. The first and second windows 12 and 13 may, on their part, be formed of the adjacent focusing element, which may have the function of mirror, as explained hereinabove. Likewise, the second mirror 4, the third mirror 15, the first focusing element 17 and the first window 12 may be constructed in the form of a small number of components, and possibly of a single one. It will also be evident to a person skilled in the art that a deflector may be utilized in each one of the assemblies set forth.

Figure 4:
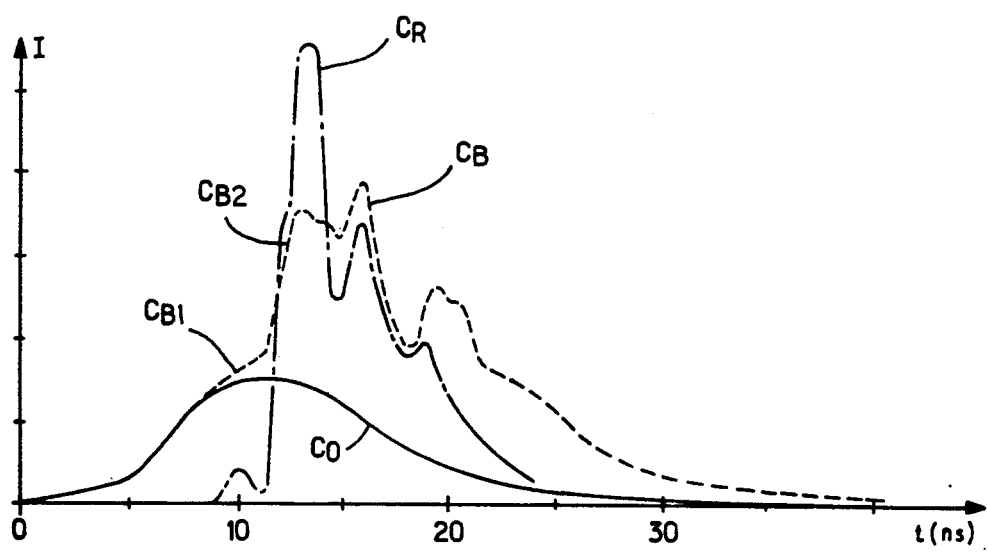
FIG. 4 represents the wave forms of the pulses obtained.

FIG. 4 represents the amplitudes I of the wave forms of the radiations as a function of the time t expressed in nanoseconds. The curve Co represents the response of the pumping laser 1 at 1.06 μm in the absence of returning third Brillouin radiation. The curve $C_B$ represents the response of this pumping laser 1 at 1.06 μm, in the presence of the third Brillouin radiation. It is observed that this curve $C_B$ exhibits a rising front having its start $C_{B1}$ coincident with the rising front of the curve Co, but which is followed by a rising front end $C_{B2}$, of steep front, which brings about approximately a doubling of the maximum amplitude of the pulse. The amplitude of the pulse $C_B$ then decreases, in a non-monotonic manner, as a function of the influence of the instantaneous excitation energy supplied in return by the third radiation, after a delay time due to the outward and return pass. The curve $C_R$ represents the amplitude, as a function of the time, of the pulse at the second Raman frequency at 1.54 μm. It is observed that this pulse exhibits a steep rising front, taking place at the same time as the end $C_{B2}$ of the rising front of the curve $C_B$, and which then decreases more rapidly than this curve $C_B$, following the undulations of the latter. This pulse $C_R$ exhibits a useful duration which is shorter than at of the pulse $C_B$ creating it, on account of the fact that the Raman medium 10 has a conversion efficiency of exponential course; thus, the increased in the maximum amplitude of the excitation pulse $C_B$ has a significant effect on the maximum amplitude of the Raman pulse $C_R$.

We claim:

1. A Raman-effect laser, comprising:

a pumping laser producing a first radiation at a first optical frequency formed of a first resonant cavity, said first radiation resonating along a first optical axis, said cavity being bounded respectively, on two opposite sides, by a first mirror and a second mirror, of optical axes aligned with said first optical axis, respectively totally reflecting and slightly reflecting at said first optical frequency, said first resonant cavity including an optical Q-switch, for retarding the resonance of said first resonant cavity, as well as an amplifying optical medium, an excitation means for exciting said amplifying optical medium, this first resonant cavity supplying, through said second mirror, a first optical radiation at a first optical frequency;

a Raman-effect medium, contained in a cell, receiving said first radiation, and supplying, in response to said first optical radiation, a second radiation by Raman effect, at a second optical frequency, as well as a third radiation, at a third optical frequency, said third radiation being caused by the Brillouin effect; and a second resonant cavity, containing said cell, said second resonant cavity is bounded, on one side, by a third mirror, of optical axis aligned with said second optical axis, which is totally transparent at said first optical frequency and totally reflecting at said second optical frequency, and bounded, on the opposite side, by a fourth mirror, of optical axis aligned with said second optical axis, which it totally transparent at said first optical frequency and partially reflecting at said second optical frequency, and including a telescope with a real focus, of optical axis aligned with said second optical axis, the flocal point of which is situated in said Raman-effect medium, said second resonance cavity tuned to said second optical frequency by at least one tuning means selected from the group consisting of; (a) adjustment of distance between said third mirror and said fourth mirror, (b) adjustment of the degree of reflection of at least one of said third mirror and said fourth mirror, and (c) adjustment of the curvature radius of at least one of the focusing elements forming the telescope, wherein, at said third optical frequency, said second mirror and third mirror are transparent, thus permitting the deflection of said third radiation into said first resonant cavity, and said first mirror is reflecting.

2. The Raman-effect laser as claimed in claim 1, wherein said second mirror and third mirror are attached to each other.

3. The Raman-effect laser as claimed in claim 1, wherein said second mirror and third mirror are coincident with respect to each other.

4. The Raman-effect laser as claimed in claim 1, wherein said pumping laser is a YAG:Nd laser.

5. The Raman-effect laser as claimed in claim 1, wherein said optical Q-switch is a saturable absorber.

6. The Raman-effect laser as claimed in claim 1, including a deflector, wherein said deflector, situated on the optical path between said first resonant cavity and said cell, is capable of deflecting said first and third optical frequencies through one and the same angle.

7. The Raman-effect laser as claimed in claim 1, wherein said cell includes a first, entrance window and a second, exit window, transmitting said first, second and third frequencies, and wherein said Raman-effect medium is a gas.

8. The Raman-effect laser as claimed in claim 1, wherein said second mirror is plane.

9. The Raman-effect laser as claimed in claim 1, wherein at least one focusing element and an adjacent mirror are constructed in the form of a single optical element.

10. The Raman-effect laser as claimed in claim 1, wherein at least one focusing element has an identical focal length for the first and the second frequency.

11. A Raman-effect laser, comprising:
a pumping laser producing a first radiation at a first optical frequency formed of a first resonant cavity, said first radiation resonating along a first optical axis, said cavity being bounded respectively, on two opposite sides, by a first mirror and a second mirror, of optical axes aligned with said first optical axis, which are respectively totally reflecting and slightly reflecting at said first optical frequency, said first resonant cavity including an optical Q-switch, for retarding the resonance of said first resonant cavity, as well as an amplifying optical medium, an excitation means for exciting said amplifying optical medium, this first resonant cavity supplying, through said second mirror, a first optical radiation at a first optical frequency;
a Raman-effect medium, contained in a cell, receiving said first radiation and supplying, in response to said first optical radiation, a second radiation by Raman effect, at a second optical frequency, as well as a third radiation, at a third optical frequency said third radiation being caused by the Brillouin effect;
a second resonant cavity, containing said cell, said second resonant cavity is bounded, on one side, by a third mirror, of optical axis aligned with said second optical axis, which is totally transparent at said first optical frequency and partially reflecting at said second optical frequency, and bounded, on the opposite side, by a fourth mirror, of optical axis aligned with said second optical axis, which is totally transparent at said first optical frequency and totally reflecting at second optical frequency, and including a telescope with a real focus of optical axis aligned with said second optical axis, the focal point of which is situated in said Raman-effect medium, said second resonance cavity tuned to said second optical frequency by at least one tuning means selected from the group consisting of: (a) adjustment of distance between said third mirror and said fourth mirror, (b) adjustment of the degree of reflection of at least one of said third mirror and said fourth mirror, and (c) adjustment of the curvature radius of at least one of the focusing elements forming the telescope; and
an optical extractor element, situated on the optical path between said first resonant cavity and said cell, receiving said first radiation emanating from said first resonant cavity and transmitting it at least partially to said cell, wherein, at said third optical frequency, said second mirror and third mirror are transparent, thus permitting the deflection of said third radiation into said first resonant cavity, and said first mirror is reflecting, and wherein said optical extractor element, at said third optical frequency, permits the passage of said third radiation towards said first resonant cavity, and directs said second radiation in a direction other than that proceeding towards the first resonant cavity, thus permitting it to emerge from said Raman-effect laser.

12. A Raman-effect laser, comprising:
a pumping laser producing a first radiation at a first optical frequency formed of a first resonant cavity, said first radiation resonating along a first optical axis, said cavity being bounded respectively, on two opposite sides, by a first mirror and a second mirror, of optical axes aligned with said first optical axis, which are respectively totally reflecting and slightly reflecting at said first optical frequency, said first resonant cavity including an optical Q-switch, for retarding the resonance of said first resonant cavity, as well as an amplifying optical medium, an excitation means for exciting said amplifying optical medium, this first resonant cavity supplying, through said second mirror, a first optical radiation at a first optical frequency;
a Raman-effect medium, contained in a cell, receiving said first radiation and supplying, in response to said first optical radiation, a second radiation by Raman effect, at a second optical frequency, as well as a third radiation, at a third optical frequency, said third radiation being caused by the Brillouin effect;
a second resonant cavity, containing said cell, said second resonant cavity is bounded, on one side, by a third mirror, of optical axis aligned with said second optical axis, which is totally transparent at said first optical frequency and totally reflecting at said second optical frequency, and bounded, on the opposite side, by a fourth mirror, of optical axis aligned with said second optical frequency, which it totally reflecting at said first optical frequency and partially reflecting at said second optical frequency, and including a telescope with a real focus, of optical axis aligned with said second optical axis, the focal point of which is situated in said Raman-effect medium, said second resonance cavity tuned to said second optical frequency by at least one tuning means selected from the group consisting of: (a) adjustment of distance between said third mirror and said fourth mirror, (b) adjustment of the degree of reflection of at least one of said third mirror and said fourth mirror, and (c) adjustment of the curvature radius of at least one of the focusing elements forming the telescope,;

an optical polarizer, situated on the optical path between said second mirror and third mirror; and a quarter-wave plate, tuned to said first frequency, situated between said cell and said fourth mirror, wherein, at least third optical frequency, said second mirror and third mirror and said polarizer are transparent, thus permitting the deflection of said third radiation into said first resonant cavity, and said first mirror is reflecting.

* * * * *